Patented Mar. 20, 1928.

1,663,183

UNITED STATES PATENT OFFICE.

JOHN H. SCHMIDT, OF CHICAGO, ILLINOIS, ASSIGNOR TO BAKELITE CORPORATION, OF NEW YORK, N. Y., A CORPORATION OF DELAWARE.

PHTHALIC ANHYDRIDE-GLYCEROL RESINS AND PROCESS OF PREPARING SAME.

No Drawing. Application filed April 28, 1924. Serial No. 709,667.

It is known that infusible resinous or resin-like bodies of dark color may be prepared by reacting on glycerol with phthalic anhydride, and hardening the resulting product by subjecting it for a relatively short time to comparatively high temperatures. It is further recognized that harder products may be obtained by increasing the baking temperature, this involving however a deeper discoloration.

I have discovered that under suitable operating conditions it is possible to prepare colorless resinous bodies, which are hard, tough and infusible, from the initial reaction products of phthalic anhydrides and polyhydric alcohols, such as glycerol and ethylene- or propylene-glycols, etc. I have found that this hardening may be effected at temperatures very much lower than those heretofore regarded as necessary for the purpose; and that by sufficiently prolonged subjection to these lower temperatures the initial liquid reaction product is progressively transformed into a hard, tough, infusible but thermo-plastic resin, which is practically colorless, and is not discolored on exposure to light. The time necessary to produce this result is, as compared with most chemical reactions, very long, but varies with the size of the piece or block, with the temperature, with the degree of hardness desired, etc. For molded blocks or slabs of moderate size a heat-treatment of several weeks or even months may be necessary. For example, in one specific instance which may be cited for illustration, blocks approximately 4 x 4 x ¼ inches were heated at about 125° C. for a period of 12 weeks, at the end of which period a practically colorless, hard, tough and infusible product resulted. A phthalic anhydride-polyhydric alcohol reaction product having such characteristics is, I believe, novel, and is broadly claimed herein.

Following is a specific embodiment of the invention, it being understood that the invention is not limited to the particular proportions or manipulative details specified by way of example:

A mixture of one part by weight of glycerol with two parts of phthalic anhydride is heated to about 150°-175° C. until the first condensation is complete, the lower temperature ranges being preferably used. The resulting condensation product is poured into molds, and maintained at about 90° C. until it assumes a firm, rubbery consistence. Thereupon the temperature is gradually increased to about 125° C., which is maintained until the resin becomes infusible, and a cooled sample has the desired hardness. In practice the total heating period may be from 1 to 12 weeks, more or less, according to the size of the molds, the precise temperature employed, the degree of hardness and other qualities desired in the product, and similar factors. The resulting resinous condensation product is transparent, free from bubbles or flaws, practically colorless, tough, infusible, and sufficiently thermo-plastic to enable it to be molded under application of heat and pressure, as for example in a hydraulic press having steam-heated platens.

The product is usually tinted or colored by the use of appropriate dyes or pigments, introduced into the mass before or during the initial condensation. A wide variety of non-fugitive dyes and coloring matter is available for this purpose. The resulting color effects are remarkably pure and brilliant, owing to the absence of coloring matters formed during the condensation or baking, and therefore for convenience designated "inherent color".

For the purposes of this invention the product before the introduction of extraneous coloring matters, should be substantially free from inherent color, that is to say it should be practically "water-white", as distinguished from the yellowish color of these resins as heretofore prepared.

I claim:

1. Process comprising reacting with phthalic anhydride upon a polyhydric alcohol at a temperature below 175° C. to form a colorless initial condensation product; subjecting said product to prolonged heating at temperatures below that at which a substantial amount of inherent color is formed; and continuing the heating until a hard, tough and infusible product substantially free from inherent color is produced.

2. The herein described novel condensation product of phthalic anhydride and a polyhydric alcohol, characterized by hardness, toughness, infusibility, and substantial absence of inherent color.

In testimony whereof, I affix my signature.

JOHN H. SCHMIDT.